United States Patent
Burky et al.

(10) Patent No.: US 7,363,625 B2
(45) Date of Patent: Apr. 22, 2008

(54) METHOD FOR CHANGING A THREAD PRIORITY IN A SIMULTANEOUS MULTITHREAD PROCESSOR

(75) Inventors: William E. Burky, Austin, TX (US); Ronald N. Kalla, Round Rock, TX (US); David A. Schroter, Round Rock, TX (US); Balaram Sinharoy, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 736 days.

(21) Appl. No.: 10/422,678

(22) Filed: Apr. 24, 2003

(65) Prior Publication Data

US 2004/0215945 A1 Oct. 28, 2004

(51) Int. Cl.
- *G06F 9/46* (2006.01)
- *G06F 15/00* (2006.01)
- *G06F 15/76* (2006.01)
- *G06F 9/30* (2006.01)
- *G06F 9/40* (2006.01)
- *G06F 7/38* (2006.01)
- *G06F 9/00* (2006.01)

(52) U.S. Cl. .................. 718/103; 718/102; 718/107; 718/108; 712/32; 712/43; 712/205; 712/206; 712/207; 712/214; 712/218; 712/220

(58) Field of Classification Search .......... 719/310; 718/100, 102–103, 107–108; 712/32, 220, 712/43, 205–207, 218, 229, 214
See application file for complete search history.

(56) References Cited

U.S. PATENT DOCUMENTS

| | | | | | |
|---|---|---|---|---|---|
| 6,076,157 | A | * | 6/2000 | Borkenhagen et al. | 712/228 |
| 6,105,051 | A | * | 8/2000 | Borkenhagen et al. | 718/103 |
| 6,108,683 | A | * | 8/2000 | Kamada et al. | 718/103 |
| 6,212,544 | B1 | | 4/2001 | Borkenhagen et al. | 709/103 |
| 6,535,905 | B1 | * | 3/2003 | Kalafatis et al. | 718/108 |
| 6,542,921 | B1 | * | 4/2003 | Sager | 718/108 |

(Continued)

OTHER PUBLICATIONS

Dermoudy, A novel approach to parenting in functional program evaluation, ACM International Conference Proceeding Series; vol. 35, pp. 217-226, Year of Publication: 2003.*

(Continued)

*Primary Examiner*—William Thomson
*Assistant Examiner*—Qing-Yuan Wu
(74) *Attorney, Agent, or Firm*—Casimer K. Salys; Winstead PC

(57) ABSTRACT

An SMT system is designed to allow software alteration of thread priority. In one case, the system signals a change in a thread priority based on the state of instruction execution and in particular when the instruction has completed execution. To alter the priority of a thread, the software uses a special form of a "no operation" (NOP) instruction (hereafter termed thread priority NOP). When the thread priority NOP is dispatched, its special NOP is decoded in the decode unit of the IDU into an operation that writes a special code into the completion table for the thread priority NOP. A "trouble" bit is also set in the completion table that indicates which instruction group contains the thread priority NOP. The trouble bit indicates that special processing is required after instruction completion. The thread priority instruction is processed after completion using the special code to change a thread's priority.

2 Claims, 4 Drawing Sheets

U.S. PATENT DOCUMENTS

| | | | |
|---|---|---|---|
| 6,567,839 B1 * | 5/2003 | Borkenhagen et al. | 718/103 |
| 6,658,447 B2 * | 12/2003 | Cota-Robles | 718/103 |
| 6,785,890 B2 * | 8/2004 | Kalafatis et al. | 718/108 |
| 6,795,845 B2 * | 9/2004 | Kalafatis et al. | 718/108 |
| 6,854,118 B2 * | 2/2005 | Kalafatis et al. | 718/108 |
| 6,865,740 B2 * | 3/2005 | Kalafatis et al. | 718/108 |
| 6,971,104 B2 * | 11/2005 | Kalafatis et al. | 718/108 |
| 6,981,261 B2 * | 12/2005 | Kalafatis et al. | 718/108 |
| 2003/0009648 A1 * | 1/2003 | Doing et al. | 711/202 |
| 2003/0018686 A1 * | 1/2003 | Kalafatis et al. | 709/102 |
| 2003/0023658 A1 * | 1/2003 | Kalafatis et al. | 709/102 |
| 2003/0154235 A1 * | 8/2003 | Sager | 709/108 |

OTHER PUBLICATIONS

Karin et al., Programming Windows NT device drivers to operate non-interrupting embedded devices, Electrical and Electronics Engineers in Israel, 2002. The 22nd Convention of, Dec. 1, 2002 pp. 105-107.*

Kucuk, Gurhan "Low-Complexity Reorder Buffer Architecture" Jun. 2002, ACM.*

* cited by examiner

METHOD FOR CHANGING A THREAD PRIORITY IN A SIMULTANEOUS MULTITHREAD PROCESSOR

TECHNICAL FIELD

The present invention relates in general to methods and circuitry for a processor having simultaneous multithreading (SMT) and single thread operation modes.

BACKGROUND INFORMATION

For a long time, the secret to more performance was to execute more instructions per cycle, otherwise known as Instruction Level Parallelism (ILP), or decreasing the latency of instructions. To execute more instructions each cycle, more functional units (e.g., integer, floating point, load/store units, etc.) have to be added. In order to more consistently execute multiple instructions, a processing paradigm called out-of-order processing (OOP) may be used, and in fact, this type of processing has become mainstream.

OOP arose because many instructions are dependent upon the outcome of other instructions, which have already been sent into the processing pipeline. To help alleviate this problem, a larger number of instructions are stored in order to allow immediate execution. The reason this is done is to find more instructions that are not dependent upon each other. The area of storage used to store the instructions that are ready to execute immediately is called the reorder buffer. The size of reorder buffers have been growing in most modern commercial computer architectures with some systems able to store as many as 126 instructions. The reason for increasing the size of the reorder buffer is simple: code that is spatially related tends also to be temporally related in terms of execution (with the possible exclusion of arrays of complex structures and linked lists). The only problem is that these instructions also have a tendency to depend upon the outcome of prior instructions. With a CPU's ever increasing amount of required code, the only current way to find more independent instructions has been to increase the size of the reorder buffer.

However, using this technique has achieved a rather impressive downturn in the rate of increased performance and in fact has been showing diminishing returns. It is now taking more and more transistors to achieve the same rate of performance increase. Instead of focusing intently upon uniprocessor ILP extraction, one can focus upon a coarser form of extracting performance at the instruction or thread level, via multithreading (multiprocessing), but without the system bus as a major constraint.

The ability to put more transistors on a single chip has allowed on-chip multiprocessing (CMP). To take advantage of the potential performance increases, the architecture cannot use these multiple processors as uniprocessors but rather must use multiprocessing that relies on executing instructions in a parallel manner. This requires the programs executed on the CMP to also be written to execute in a parallel manner rather than in a purely serial or sequential manner. Assuming that the application is written to execute in a parallel manner (multithreaded), there are inherent difficulties in making the program written in this fashion execute faster proportional to the number of added processors.

The general concept behind using multiple cores on one die is to extract more performance by executing two threads at once. By doing so, the two CPUs together are able to keep a higher percentage of the aggregate number of functional units doing useful work at all times. If a processor has more functional units, then a lower percentage of those units may be doing useful work at any one time. The on-chip multiprocessor lowers the number of functional units per processor, and distributes separate tasks (or threads) to each processor. In this way, it is able to achieve a higher throughput on both tasks combined. A comparative uniprocessor would be able to get through one thread, or task, faster than a CMP chip could, because, although there are wasted functional units, there are also "bursts" of activity produced when the processor computes multiple pieces of data at the same time and uses all available functional units. One idea behind multiprocessors is to keep the individual processors from experiencing such burst activity times and instead have each processor use what resources it has available more frequently and therefore efficiently. The non-use of some of the functional units during a clock cycle is known as "horizontal waste," which CMP tries to avoid.

However, there are problems with CMP. The traditional CMP chip sacrifices single-thread performance in order to expedite the completion of two or more threads. In this way, a CMP chip is comparatively less flexible for general use, because if there is only one thread, an entire half of the allotted resources are idle and completely useless (just as adding another processor in a system that uses a singly threaded program is useless in a traditional multiprocessor (MP) system). One approach to making the functional units in a CMP more efficient is to use course-grained multithreading (CMT). CMT improves the efficiency with respect to the usage of the functional units by executing one thread for a certain number of clock cycles. The efficiency is improved due to a decrease in "vertical waste." Vertical waste describes situations in which none of the functional units are working due to one thread stalling.

When switching to another thread, the processor saves the state of that thread (i.e., it saves where instructions are in the pipeline, which units are being used) and switches to another one. It does so by using multiple register sets. The advantage of this is due to the fact that often a thread can only go for so long before it falls upon a cache miss, or runs out of independent instructions to execute. A CMT processor can only execute as many different threads in this way as it has support for. So, it can only store as many threads as there are physical locations for each of these threads to store the state of their execution. An N-way CMT processor would therefore need to have the ability to store the state of N threads.

A variation on this concept would be to execute one thread until it has experienced a cache miss (usually a L2 (secondary) cache miss), at which point the system would switch to another thread. This has the advantage of simplifying the logic needed to rotate the threads through a processor, as it will simply switch to another thread as soon as the prior thread is stalled. The penalty of waiting for a requested block to be transferred back into the cache is then alleviated. This is similar to the hit under miss (or hit under multiple miss) caching scheme used by some processors, but it differs because it operates on threads instead of upon instructions. The advantages of CMT over CMP are CMT does not sacrifice single-thread performance, and there is less hardware duplication (less hardware that is halved to make the two processors "equal" to a comparable CMT).

A more aggressive approach to multithreading is called fine-grained multithreading (FMT). Like CMT, the basis of FMT is to switch rapidly between threads. Unlike CMT, however, the idea is to switch each and every cycle. While both CMT and FMT actually do indeed slow down the completion of one thread, FMT expedites the completion of all the threads being worked on, and it is overall throughput which generally matters most.

CMPs may remove some horizontal waste in and unto themselves. CMT and FMT may remove some (or all) vertical waste. However an architecture that comprises an advanced form of multithreading, referred to as Simultaneous Multithreading (SMT), may be used to reduce both horizontal and vertical waste. The major goal of SMT is to have the ability to run instructions from different threads at any given time and in any given functional unit. By rotating through threads, an SMT architecture acts like an FMT processor, and by executing instructions from different threads at the same time, it acts like CMP. Because of this, it allows architects to design wider cores without the worry of diminishing returns. It is reasonable for SMT to achieve higher efficiency than FMT due to its ability to share "unused" functional units among differing threads; in this way, SMT achieves the efficiency of a CMP machine. However, unlike a CMP system, an SMT system makes little to no sacrifice (the small sacrifice is discussed later) for single threaded performance. The reason for this is simple. Whereas much of a CMP processor remains idle when running a single thread and the more processors on the CMP chip makes this problem more pronounced, an SMT processor can dedicate all functional units to the single thread. While this is obviously not as valuable as being able to run multiple threads, the ability to balance between single thread and multithreaded environments is a very useful feature. This means that an SMT processor may exploit thread-level parallelism (TLP) if it is present, and if not, will give full attention to instruction level parallelism (ILP).

In order to support multiple threads, an SMT processor requires more registers than the traditional superscalar processor. The general aim is to provide as many registers for each supported thread as there would be for a uniprocessor. For a traditional reduced instruction set computer (RISC) chip, this implies 32 times N registers (where N is the number of threads an SMT processor could handle in one cycle), plus whatever renaming registers are required. For a 4-way SMT processor RISC processor, this would mean 128 registers, plus however many renaming registers are needed.

Most SMT models are straightforward extensions of a conventional out-of-order processor. With an increase in the actual throughput comes more demands upon instruction issue width, which should be increased accordingly. Because of the aforementioned increase in the register file size, an SMT pipeline length may be increased by two stages (one to select register bank and one to do a read or write) so as not to slow down the length of the clock cycle. The register read and register write stages are therefore both broken up into two pipelined stages.

In order to not allow any one thread to dominate the pipeline, an effort should be made to ensure that the other threads get a realistic slice of the execution time and resources. When the functional units are requesting work to do, the fetch mechanism will provide a higher priority to those threads that have the fewest instructions already in the pipeline. Of course, if the other threads have little they can do, more instructions from the thread are already dominating the pipelines.

SMT is about sharing whatever possible. However, in some instances, this disrupts the traditional organization of data, as well as instruction flow. The branch prediction unit becomes less effective when shared, because it has to keep track of more threads with more instructions and will therefore be less efficient at giving an accurate prediction. This means that the pipeline will need to be flushed more often due to miss prediction, but the ability to run multiple threads more than makes up for this deficit.

The penalty for a misprediction is greater due to the longer pipeline used by an SMT architecture (by two stages), which is in turn due to the rather large register file required. However, techniques have been developed to minimize the number of registers needed per thread in an SMT architecture. This is done by more efficient operating system (OS) and hardware support for better deallocation of registers, and the ability to share registers from another thread context if another thread is not using all of them.

Another issue is the number of threads in relation to the size of caches, the line sizes of caches, and the bandwidth afforded by them. As is the case for single-threaded programs, increasing the cache-line size decreases the miss rate but also increases the miss penalty. Having support for more threads which use more differing data exacerbates this problem and thus less of the cache is effectively useful for each thread. This contention for the cache is even more pronounced when dealing with a multiprogrammed workload over a multithreaded workload. Thus, if more threads are in use, then the caches should be larger. This also applies to CMP processors with shared L2 caches.

The more threads that are in use results in a higher overall performance and the differences in association of memory data become more readily apparent. There is an indication that when the L1 (primary) cache size is kept constant, the highest level of performance is achieved using a more associative cache, despite longer access times. Tests have been conducted to determine performance with varying block sizes that differ associatively while varying the numbers of threads. As before, increasing the associative level of blocks increased the performance at all times; however, increasing the block size decreased performance if more than two threads were in use. This was so much so that the increase in the degree of association of blocks could not make up for the deficit caused by the greater miss penalty of the larger block size.

An SMT system may alternately load a shared pipeline with instruction addresses from two threads. Switching between threads may normally occur on every clock. Switching between threads in this manner would provide each thread with equal priority to system resources. In an SMT system with multiple execution units, it may be desirable to execute instruction out-of-order to better utilize the execution units. A variety of conditions may lead to pipeline stalls wherein instructions from a thread cannot be immediately executed. At other times conditions may make it desirable to alter the priority of a given thread thereby changing the thread selection process to vary from loading instructions equally from each thread. Varying the priority and thus thread selection may be due to hardware detected conditions or from conditions that are controlled by software.

To change a threads priority with software, an instruction is necessary to do the alteration process. Special "no operation" NOP instructions have been defined in the SMT architecture that allow the software to dynamically change a thread's priority. If a process for examining NOP instructions for conditions allowing thread priority modification is done incorrectly, it may require special processing by the FXUs or it may slow down the processing of all NOP instructions.

When to switch from one thread to another is made more difficult by the fact that instructions are pipelined and execution may occur out-of-order. If the condition for switching threads depends on the completion of an instruction, an in-order execution system is assured that an instruction in the pipeline for a particular thread cannot complete before any instruction for that thread dispatched ahead of it has completed. Thus, the in-order system may change a thread's priority by processing the NOP instruction earlier in the pipeline with good assurances that the NOP instruction will complete. However, in an out-of-order system the decision needs to be made at the NOP instruction completion so that the effects of altering thread priority do not occur if the NOP instruction does not in fact execute. There is, therefore, a need for a mechanism for a special NOP instruction form used to alter a thread priority to only take effect upon the NOP instruction completion without slowing down all NOP instructions and without requiring special NOP instruction processing in the FXUs.

SUMMARY OF THE INVENTION

An SMT system can alter the priority of the threads under software control. In one case, the system signals a change in a thread priority based on the state of instruction execution and in particular when the instruction has completed execution. To alter a threads priority, the software uses a special form of a "no operation" (NOP) instruction (hereafter termed thread priority NOP).

When the thread priority NOP is dispatched, the special NOPs are decoded in the decode unit of the IDU into an internal operation that writes a special code into the completion table for the thread priority NOP. A "trouble" bit is also set in the completion table that indicates which instruction group contains the special code. The completion table tracks groups of instructions rather than individual instructions. There is one special code entry for each instruction group in the completion table. The trouble bit indicates that something beyond just completing the particular instruction group is required. In the present invention, the priority of a particular thread having the thread priority NOP is changed at completion. Thus, thread priority does not change speculatively since only a completed thread priority NOP executes special processing of the special NOP form to alter a thread priority.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
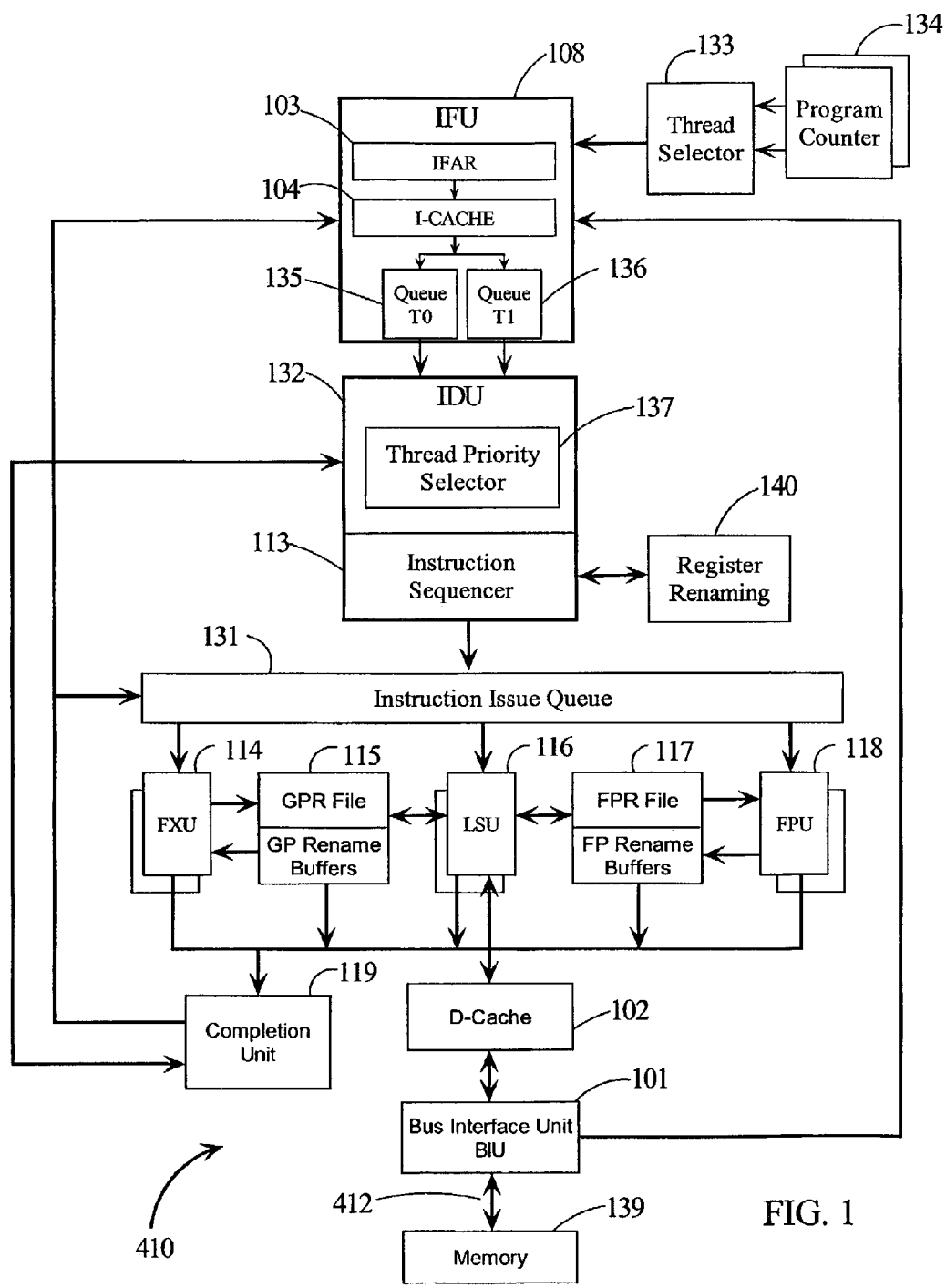
FIG. 1 is a block diagram of functional units in an SMT processor according to embodiments of the present invention.

In the following description, numerous specific details are set forth to provide a thorough understanding of the present invention. However, it will be obvious to those skilled in the art that the present invention may be practiced without such specific details. In other instances, well-known circuits may be shown in block diagram form in order not to obscure the present invention in unnecessary detail. For the most part, details concerning timing, data formats within communication protocols, and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Referring to FIG. 1, there are illustrated details of CPU 410. CPU 410 is designed to execute multiple instructions per clock cycle. Thus, multiple instructions may be executing in any of the execution units, fixed point units (FXUs) 114, floating point units (FPUs) 118, and load/store units (LSUs) 116 during any one clock cycle. Likewise, CPU 410 may simultaneously execute instructions from multiple threads in an SMT mode.

Program counters (PCs) 134 correspond to thread zero (T0) and thread one (T1) that have instructions for execution. Thread selector 133 alternately selects between T0 and T1 to couple an instruction address to instruction fetch unit (IFU) 108. Instruction addresses are loaded into instruction fetch address register (IFAR) 103. IFAR 103 alternately fetches instructions for each thread from instruction cache (I-Cache) 104. Instructions are buffered in instruction queue (IQ) 135 for T0 and IQ 136 for T1. IQ 135 and IQ 136 are coupled to instruction dispatch unit (IDU) 132. Instructions are selected and read from IQ 135 and IQ 136 under control of thread priority selector 137. Normally, thread priority selector 137 reads instructions from IQ 135 and IQ 136 substantially proportional to each thread's program controlled priority.

The instructions are decoded in a decoder (not shown) in IDU 132. Instruction sequencer 113 then may place the instructions in groups in an order determined by various algorithms. The groups of instructions are forwarded to instruction issue queue (IIQ) 131. The instruction sequencer 113 receives instructions from both threads in program order, but the instructions may be issued from the IIQ 131 out of program order and from either thread. The general purpose register (GPR) file 115 and floating point register (FPR) file 117 are used by multiple executing units and represent the program state of the system. These hardware registers may be referred to as the "architected" registers. When an instruction is put into an issue queue, each architected register is renamed. Each architected register that is being modified is assigned a physical register and a corresponding look-up table identifies physical registers that are associated with an architected register. Therefore in the issue queue, the architected register has been renamed so that multiple copies of an architected register may exist at the same time. This allows instructions to be executed out-of-order as long as source operands are available. Register renaming unit 140, renames and maps the registers so that unused physical registers may be reassigned when all instructions referencing a particular physical register complete and the physical register does not contain the latest architected state.

Instructions are queued in IIQ 131 for execution in the appropriate execution unit. If an instruction contains a fixed point operation, then any of the multiple fixed point units (FXUs) 114 may be used. All of the execution units, FXU 114, FPU 118 and LSU 116 are coupled to completion unit 119 that has completion tables (not shown) indicating which of the issued instructions have completed and other status information. Information from completion unit 119 is forwarded to IFU 108. IDU 132 may also send information to completion unit 119. Data from a store operation from LSU 116 is coupled to data cache (D-Cache) 102. This data may be stored in D-Cache 102 for near term use and/or forwarded to bus interface unit (BIU) 101 which sends the data over bus 412 to memory 139. LSU 116 may load data from D-Cache 102 for use by the execution units (e.g., FXU 114).

Figure 2:
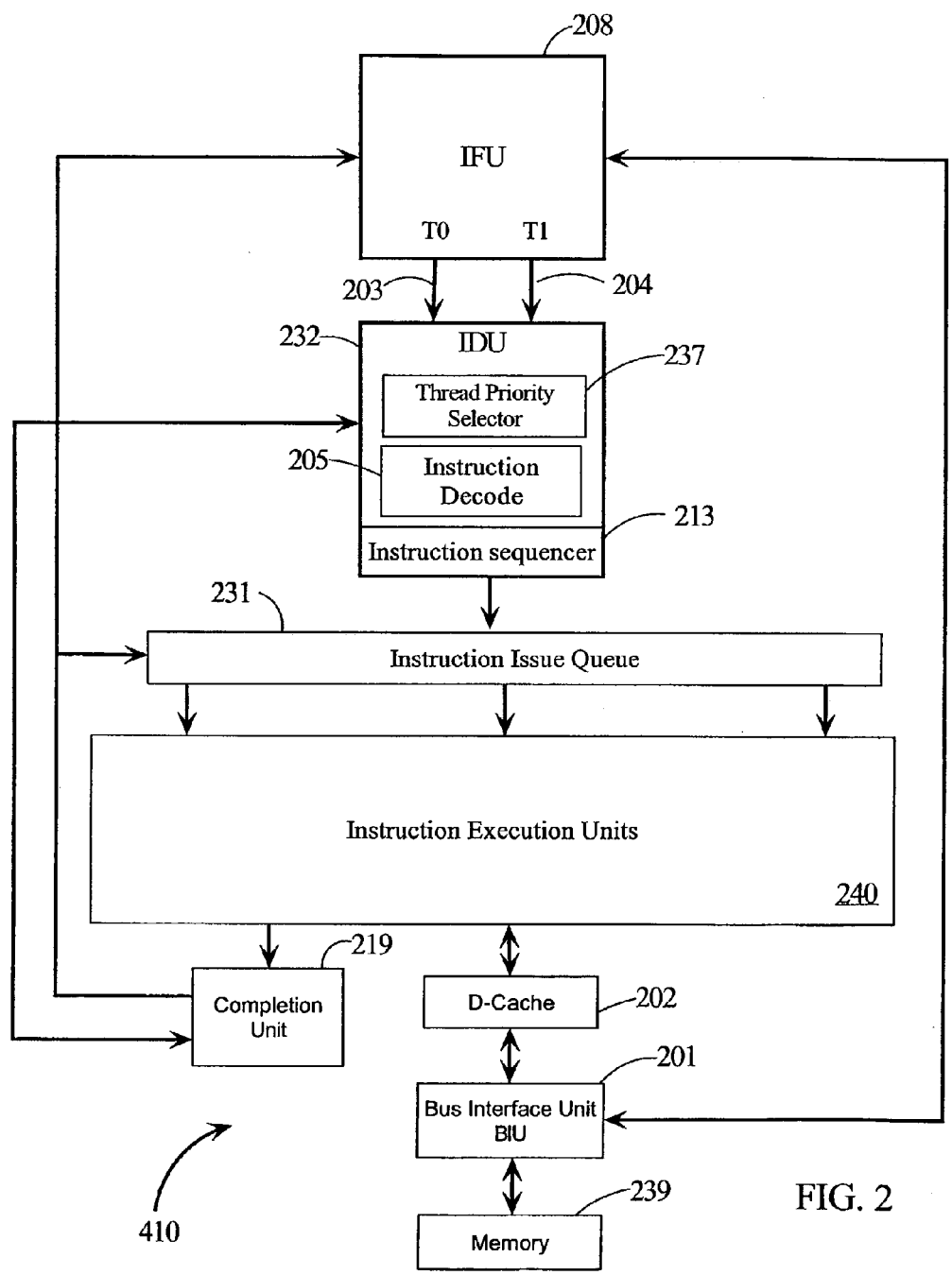
FIG. 2 is a block diagram of circuitry for implementing method steps of embodiments of the present invention.

FIG. 2 is a block diagram of circuit functions that incorporate embodiments of the present invention. IFU 208 has queues (e.g., similar to queues 135 and 136 in FIG. 1) providing instructions 203 and 204 from threads T0 and T1 respectively. Instructions are selected and read from T0 and T1 under control of thread priority selector 237. Normally, thread priority selector 237 reads instructions from T0 and T1 substantially proportional to each thread's program controlled priority.

The instructions are decoded in instruction decoder 205 in IDU 232. Instruction sequencer 213 then may place the instructions in groups in an order determined by various algorithms. For example, in embodiments of the present invention an instruction group comprise five instructions from a particular thread. The instruction groups are forwarded to IIQ 231 which has multiple queues coupled to the execution units 240. Instructions are queued in IIQ 231 for execution in instruction execution units 240. Execution units 240 are coupled to completion unit 219 that has a group completion table (GCT) (not shown) indicating which of the issued instructions have completed and other status information. Data from LSU units in instruction execution units 240 is coupled to data cache (D-Cache) 202. This data may be stored in D-Cache 202 for near term use and/or forwarded to bus interface unit (BIU) 201 which sends the data to memory 239. IFU 208 may receive instructions stored in memory 231 via BIU 201.

When a thread priority NOP instruction for changing a thread's priority is dispatched, a special code is written to the GCT in completion unit 219. Additionally, a trouble bit in the instruction group containing the thread NOP instruction is set. However, since instructions may be dispatched speculatively, it is not known at this time whether the thread priority NOP instruction will actually execute. When the instruction group containing the thread priority NOP instruction has completed execution within instruction execution units 240, completion unit 219 is notified. The trouble bit in the completed group indicates that additional special processing is necessary. For the thread priority NOP instruction, the special code is processed in the completion unit 219 to change the thread priority. The special processing indicates what data to send to a thread priority register (not shown) in the thread priority selector 237. There is a mode of operation where the thread priority register may be written via a execution unit (e.g., in 240) writing a value to a general purpose register (GPR) in a GPR file (e.g. GPR file 115 in FIG. 1). However, this uses execution resources and register space. In embodiments of the present invention, thread priority NOP instructions are processed but not in an execution unit. As stated, this processing occurs in the completion unit 219.

Figure 3:
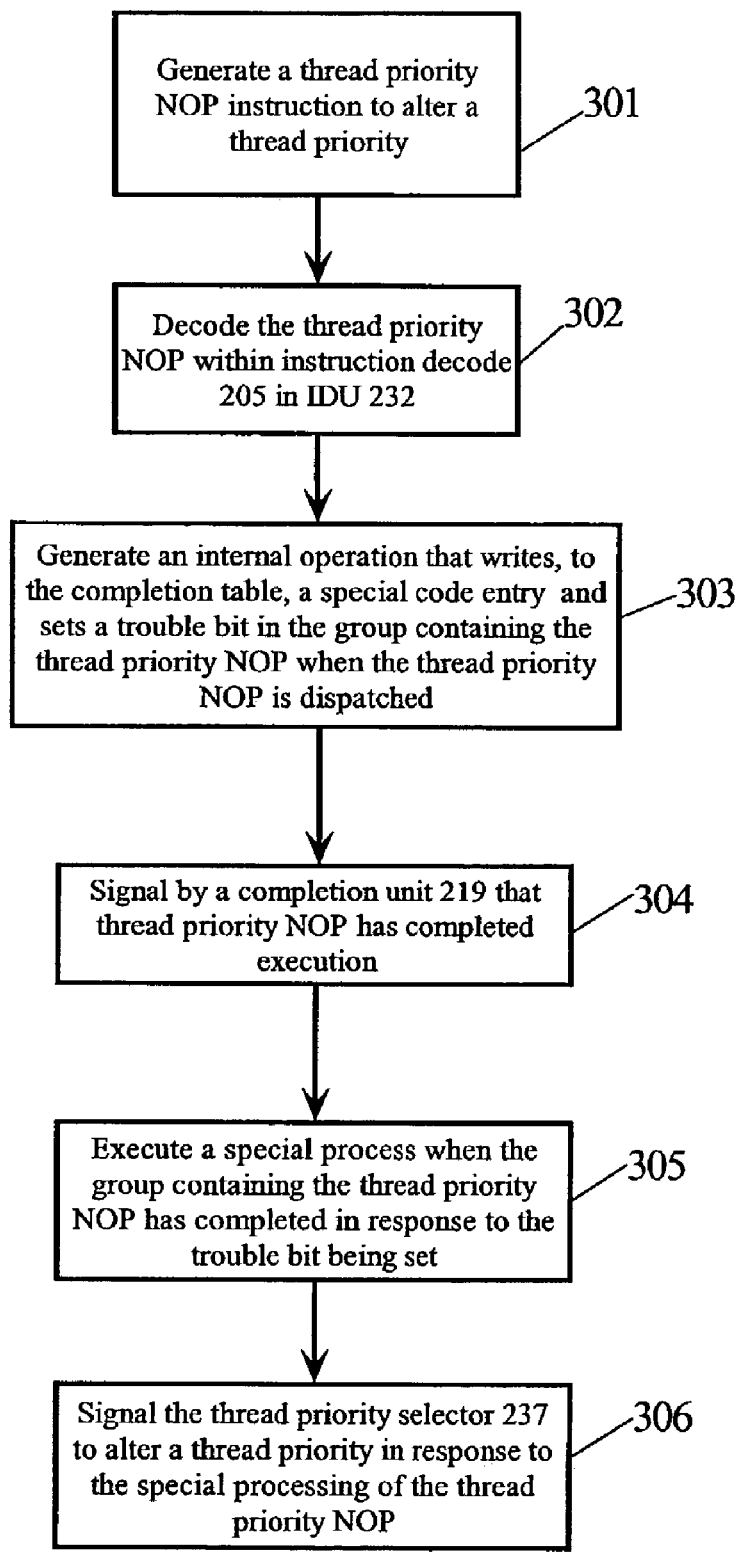
FIG. 3 is a flow diagram of method steps according to embodiments of the present invention.

FIG. 3 is a flow diagram of method steps in embodiments of the present invention. In step 301, software generates a thread priority NOP instruction to alter the priority of a thread. In step 302, the thread priority NOP is decoded within instruction decode 205 in IDU 232. In step 303, an internal operation is generated in response to the decode of the thread priority NOP that writes, into the GCT in completion unit 219, a special code entry and sets a trouble bit for the group containing the thread priority NOP when it is dispatched from IDU 232. In step 304, completion unit 219 determines when the group containing the thread priority NOP instruction has completed. A trouble bit with this group indicates that additional processing is necessary in completion unit 219. In step 305, the special code entry in the thread priority NOP instruction is decoded (additional processing) when the group containing the thread priority NOP has completed execution in response to the trouble bit being set This decode generates the data needed to set a thread priority register in thread priority selector 237. In step 307, the data is sent to the thread priority selector 237 to alter a thread priority in response to the special processing of the thread priority NOP. This guarantees that the thread's priority is not changed speculatively and it does not use execution resources or register space.

Figure 4:
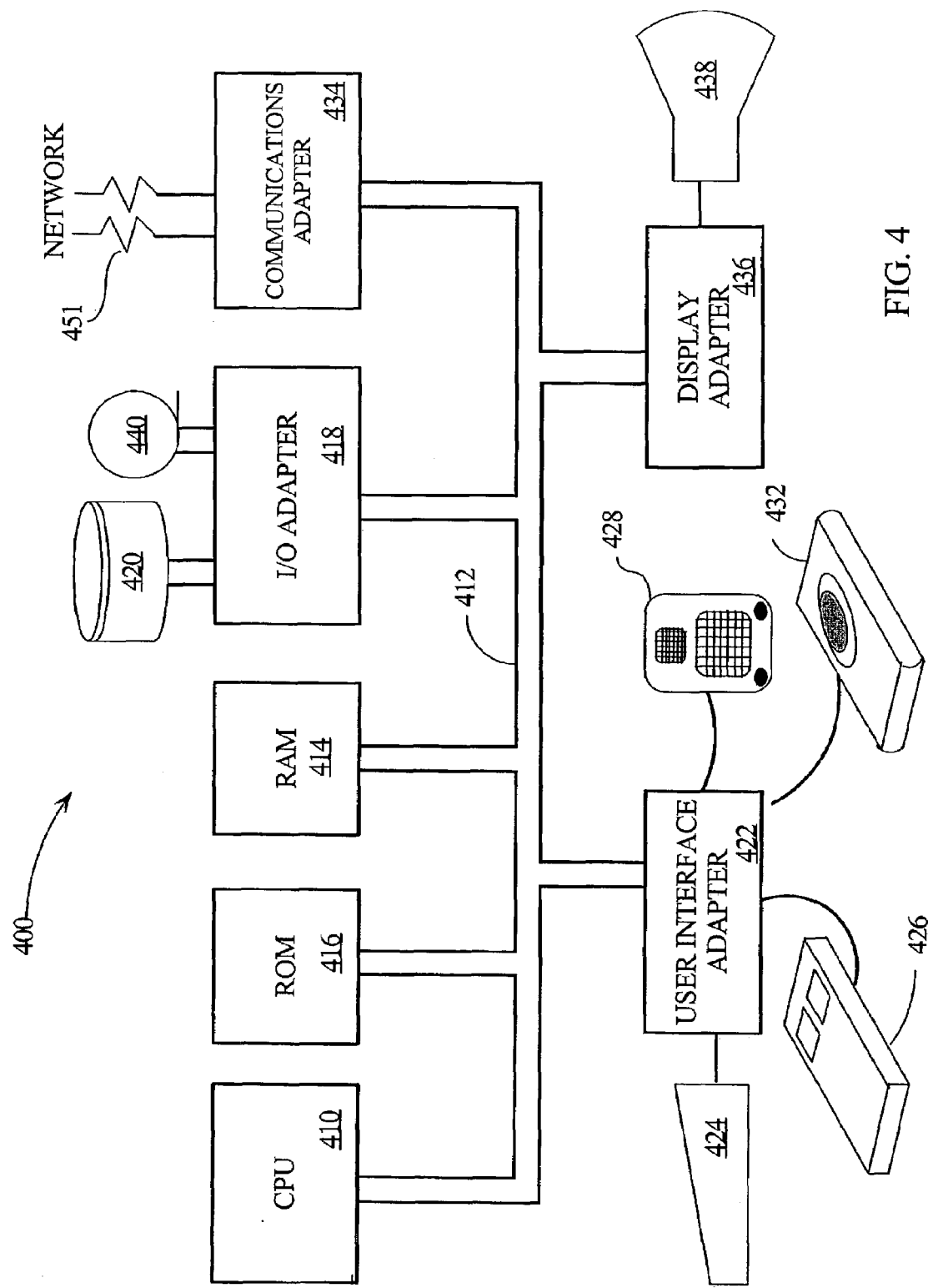
FIG. 4 is a representative hardware environment for practicing the present invention.

A representative hardware environment for practicing the present invention is depicted in FIG. 4, which illustrates a typical hardware configuration of a workstation in accordance with the subject invention having central processing unit (CPU) 410 with simultaneous multithread (SMT) processing and a number of other units interconnected via system bus 412. The workstation shown in FIG. 4 includes random access memory (RAM) 414, read only memory (ROM) 416, and input/output (I/O) adapter 418 for connecting peripheral devices such as disk units 420 and tape drives 440 to bus 412, user interface adapter 422 for connecting keyboard 424, mouse 426, speaker 428, microphone 432, and/or other user interface devices such as a touch screen device (not shown) to bus 412, communication adapter 434 for connecting the workstation to a data processing network, and display adapter 436 for connecting bus 412 to display device 438.

Although the present invention and its advantages have been described in detail, it should be understood that various changes, substitutions and alterations can be made herein without departing from the spirit and scope of the invention as defined by the appended claims.

What is claimed is:

1. A method for dynamically changing a priority of a thread in a simultaneous multithread (SMT) processor comprising the steps of:

generating a thread priority no operation (NOP) instruction to change an instruction execution priority of a thread selected from first and second threads;

decoding said thread priority NOP instruction;

writing a special code for modifying said instruction execution priority of said selected thread into a group completion table (GCT) in response to a dispatch of said thread priority NOP instruction;

setting a trouble bit in said GCT corresponding to an instruction group containing said thread priority NOP instruction in response to said dispatch of said thread priority NOP instruction;

determining within a completion unit that said instruction group has completed;

processing said special code to generate priority data for setting a first priority value for said selected thread in response to said trouble bit being set to an ON logic state; and sending said first priority value to a thread priority selector controlling dispatching of instructions for said selected thread and changing said selected thread's instruction execution priority after said instruction group containing said thread priority NOP instruction has completed.

2. The method of claim 1, wherein said thread priority selector selects instructions from first and second thread instruction queues such that numbers of dispatched first and second thread instructions are in a proportion corresponding to each thread's instruction execution priority.

* * * * *